(12) United States Patent
Namie et al.

(10) Patent No.: US 7,787,001 B2
(45) Date of Patent: Aug. 31, 2010

(54) IMAGE PROCESSING APPARATUS, IMAGE DISPLAY APPARATUS, IMAGE PROCESSING METHOD, AND COMPUTER PRODUCT

(75) Inventors: Kenji Namie, Kanagawa (JP);
Toshiharu Murai, Kanagawa (JP);
Toshiaki Tokita, Kanagawa (JP);
Yasuyuki Takiguchi, Kanagawa (JP);
Kazuhiro Fujita, Kanagawa (JP);
Hiroyuki Sugimoto, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 957 days.

(21) Appl. No.: 11/596,882

(22) PCT Filed: Mar. 16, 2006

(86) PCT No.: PCT/JP2006/305759
§ 371 (c)(1),
(2), (4) Date: Nov. 17, 2006

(87) PCT Pub. No.: WO2006/101149
PCT Pub. Date: Sep. 28, 2006

(65) Prior Publication Data
US 2008/0030527 A1 Feb. 7, 2008

(30) Foreign Application Priority Data
Mar. 17, 2005 (JP) ............... 2005-078207

(51) Int. Cl.
*G09G 5/02* (2006.01)
(52) U.S. Cl. ........................ 345/698; 345/3.3
(58) Field of Classification Search .......... 345/3.3, 345/698
See application file for complete search history.

(56) References Cited

U.S. PATENT DOCUMENTS

2004/0027313 A1* 2/2004 Pate et al. .............. 345/30
2004/0233185 A1* 11/2004 Hashimoto et al. ..... 345/204

FOREIGN PATENT DOCUMENTS

| CN | 1573857 A | 2/2005 |
|---|---|---|
| EP | 1 480 193 A2 | 11/2004 |
| GB | 2 247 596 | 3/1992 |
| JP | 7 134275 | 5/1995 |
| JP | 2000 347324 | 12/2000 |
| JP | 2001 183741 | 7/2001 |
| JP | 2001 290462 | 10/2001 |
| JP | 2002 116717 | 4/2002 |
| JP | 2003 322908 | 11/2003 |
| JP | 2004 70365 | 3/2004 |
| JP | 2004 94247 | 3/2004 |
| JP | 2005 11314 | 1/2005 |
| JP | 2005 128190 | 5/2005 |
| JP | 2006 10914 | 1/2006 |

* cited by examiner

*Primary Examiner*—Chanh Nguyen
*Assistant Examiner*—Adakou Foli
(74) *Attorney, Agent, or Firm*—Oblon, Spivak, McClelland, Maier & Neustadt, L.L.P.

(57) ABSTRACT

An image processing apparatus that performs resolution conversion on image data to output to a display unit includes a resolution converting unit configured to perform resolution conversion on the image data to generate pixel data having a resolution α times as high as a resolution of the display unit, where α>1; an image processing unit configured to perform an image processing on the pixel data; and a decimation unit configured to decimate the pixel data on which the image processing has been performed, to have a resolution equal to or lower than the resolution of the display unit, and to output decimated data to the display unit.

7 Claims, 13 Drawing Sheets

RELATED ART

⊘ : DISPLAY PIXEL

⊘ : DISPLAY PIXEL

◌ : DISPLAY PIXEL

◌ : DISPLAY PIXEL

FIG.11
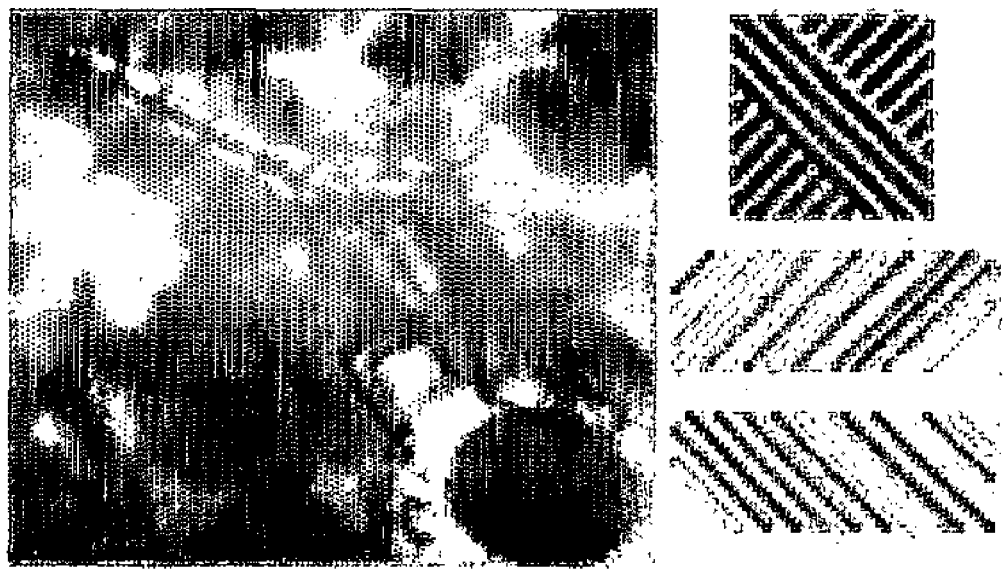
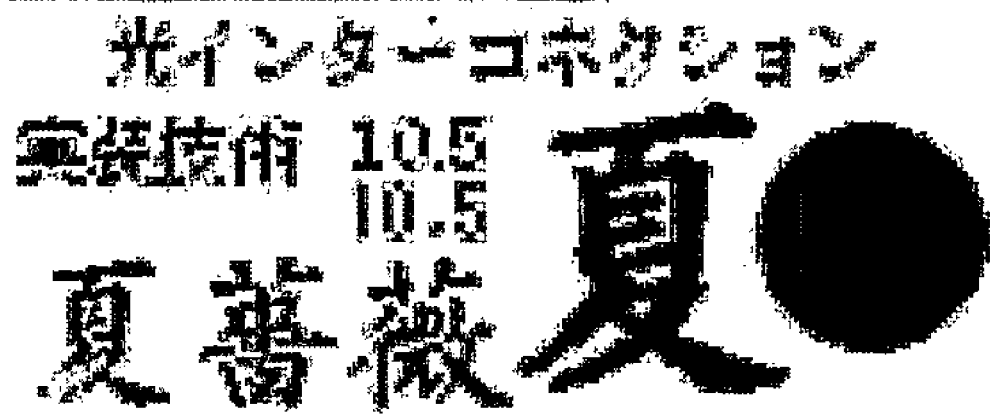

IMAGE PROCESSING APPARATUS, IMAGE DISPLAY APPARATUS, IMAGE PROCESSING METHOD, AND COMPUTER PRODUCT

TECHNICAL FIELD

The present invention relates to an image processing apparatus, an image display apparatus, an image processing method, and a computer product.

BACKGROUND ART

Conventionally, digital image data input to an image display apparatus is in a form in which pixels of red (R), green (G), and blue (B) are arranged into a square or rectangular parallelepiped array. In color display of the image display apparatus, a display effect viewed by a person greatly differs depending on a method for arranging the RGB pixels. In computer display, to express a sharp image, color units each having a set of pixels of R, G, and B are arranged in a square or rectangular parallelepiped array. When high resolution is required, a delta array with which the highest resolution is obtained among all forms of arrays formed with pixels of same number is often used. In the delta array, pixels are shifted by a half pitch for every line.

Conventionally, a method for improving resolution in the delta array is proposed. In such a method, a display element constituted by plural pixels for which light can be controlled according to image data, and pixel shifting means for shifting positions of pixels by half a distance between two adjacent pixels both longitudinally and transversely in a diagonal direction of the display pixels are used. In a technique disclosed in, for example Japanese Patent Application Laid-Open No. H7-134275, a rotating plate is used for changing a direction of light refraction, as the pixel shifting means.

Furthermore, in a technique disclosed in, for example, Japanese Patent Application Laid-Open No. 2003-322908, to-be-displayed green display pixels excellent in human visibility are provided at potions shifted by half a pixel longitudinally and transversely on display elements of red, blue, and green to obtain high resolution with a single projector.

In a technique disclosed in, for example, Japanese Patent Application Laid-Open No. 2004-70365, pixels are shifted using an image shifter to improve resolution.

Most of the conventional methods to improve resolution are proposed on the premise that an image is viewed from a distance (visible distance) at which a pixel structure is not recognized. Such methods are applied to a movie, and a television that are supposed to be viewed away from an image keeping a sufficient distance. Therefore, color components that constitute the displayed pixels and an image roughness such as out-of-color registration is recognized less frequently. However, image display apparatuses having a large screen used in a meeting have been increasing. Such image display apparatuses are often used in a situation in which the pixel structure can be recognized by viewers because of its use in a meeting or the like. Therefore, the color components that constitute the pixels, deviations of the respective colors, and the like should be considered.

The technique disclosed in the Japanese Patent Application Laid-Open No. 7-134275 and the technique disclosed in the Japanese Patent Application Laid-Open No. 2003-322908 cause frequent occurrence of out-of-color registration, resulting in degradation of an image quality.

Meanwhile, to improve the resolution of the display image by shifting pixels, there have been proposed a method by shifting pixels in one of a horizontal direction and a vertical direction or in plural directions combining the horizontal direction and the vertical direction, and a method for displaying an image in a delta array by diagonally shifting pixels using one pixel shifting means and improving resolution closer to a twofold resolution transversely and longitudinally at low cost. However, the techniques for displaying the high resolution image by arranging pixels in the delta array or diagonally shifting the pixel positions have the following problems. With the technique disclosed in the Japanese Patent Application Laid-Open No. 2004-70365, the resolution is improved only by increasing the number of display pixels. Data obtained by extracting only converted pixel data on pixels displayed in the delta array from image data (converted image data) having pixel data (converted pixel data) in the square or rectangular parallelepiped array generated by an image processing such as resolution conversion is displayed as output pixel data. The other converted pixel data is not used for the output image. Due to this, the data that cannot be used for the output pixel data is generated in the converted pixel data arranged in the square or rectangular parallelepiped array. Accordingly, image data dropouts occur to the displayed image and the image quality is degraded.

For example, an input image is made equal in resolution to converted image data in a square or rectangular parallelepiped array on the display apparatus, pixels of the input image and those of the converted image are arranged as shown in FIG. 6 according to the conventional technique. However, output pixels used for a displayed image are only those represented by diagonally shaded circles shown in FIG. 6 whereas data on pixels represented by white circles are not used. Accordingly, image data dropouts occur.

The present invention has been achieved to solve the above problems, and it is an object of the present invention to provide an image processing apparatus, an image display apparatus, an image processing method, and a computer product capable of generating and displaying output image data without image data dropouts, and improving a quality and a resolution of a displayed image by using converted pixel data that has not been conventionally used to generate the output image data to be displayed from among converted pixel data in a square or rectangular parallelepiped array obtained through an image processing such as resolution conversion in an image display apparatus in which pixels are arranged in a delta array or an image display apparatus in which pixels are shifted in a diagonal direction.

DISCLOSURE OF INVENTION

Problem to be Solved by the Invention

An image processing apparatus according to the present invention performs resolution conversion on image data to output to a display unit, and includes a resolution converting unit configured to perform resolution conversion on the image data to generate pixel data having a resolution $\alpha$ times as high as a resolution of the display unit, where $\alpha>1$; an image processing unit configured to perform an image processing on the pixel data; and a decimation unit configured to decimate the pixel data on which the image processing has been performed, to have a resolution equal to or lower than the resolution of the display unit, and to output decimated data to the display unit.

According to the image processing apparatus according to the present invention, image data is subjected to resolution conversion, the image data subjected to the resolution conversion is subjected to an image processing, and then decimated to obtain pixel data to be output to a display unit.

Therefore, an image data dropout caused by a failure to use a part of the converted image data for the output image data does not occur. Thus, the image processing suitable for display of an image having a high-quality and high-resolution can be performed.

An image display apparatus includes an image processing apparatus including a resolution converting unit configured to perform resolution conversion on image data to generate pixel data having a resolution α times as high as a resolution of a display unit, where α>1; an image processing unit configured to perform an image processing on the pixel data; and a decimation unit configured to decimate the pixel data on which the image processing has been performed, to have a resolution equal to or lower than the resolution of the display unit, and to output decimated data to the display unit; and a display element capable of controlling a light according to output image data generated by the image processing apparatus, and configured to display an image constituted by M×N pixels having N lines of pixel lines each of which includes M pieces of pixels arranged in a horizontal direction at a pitch Ph, the pixel lines arranged in a vertical direction at a pitch Pv, the pixel lines arranged so that two pixel lines adjacent to each other are shifted by approximately 0.5 Ph in the horizontal direction.

According to the present invention, the image display apparatus includes the image processing apparatus that performs the image processing suitable for display of an image having a high quality and a high resolution. Thus, it is possible to provide an image display apparatus capable of displaying an image having a high quality and a high resolution.

BRIEF DESCRIPTION OF DRAWINGS

FIG. 11 depicts a display image when the filtering is performed and diagonal shifting is performed on the pixels;

BEST MODE(S) FOR CARRYING OUT THE INVENTION

Exemplary embodiments according to the present invention will be explained below in detail with reference to the accompanying drawings. Note that the present invention is not limited to the embodiments.

Figure 1:
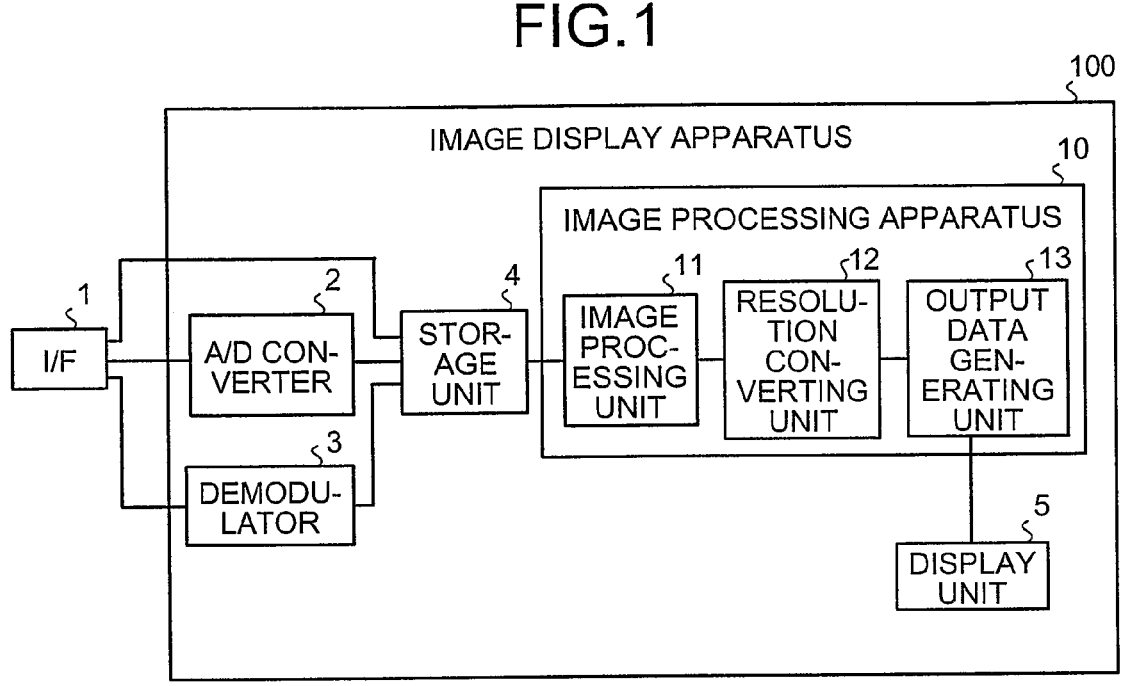
FIG. 1 is a block diagram of an image processing apparatus according to a first embodiment of the present invention.

FIG. 1 is a block diagram of an image processing apparatus according to a first embodiment of the present invention. An image processing apparatus 10 will be explained, assuming that it is incorporated into an image display apparatus 100. Alternatively, the image processing apparatus 10 and the image display apparatus 100 can be configured separately.

The image display apparatus 100 includes an interface (I/F) 1, an analog/digital (A/D) converter 2, a demodulator 3, a storage unit 4, a display unit 5, and the image processing apparatus 10.

The image processing apparatus 10 includes an image processing unit 11, a resolution converting unit 12, and an output data generating unit 13.

The image display apparatus 100 inputs image data through the I/F 1 in an arbitrary one of various forms such as a digital form and an analog form. When analog image data is input to the image display apparatus 100, then the analog image data is converted into digital image data by the A/D converter 2, and a resolution of the image data is detected. The image data input as a modulated signal is demodulated by the demodulator 3 and a resolution of the image data is detected. In case of the image data, the resolution of the image data is detected by a horizontal synchronization signal and a vertical synchronization signal.

The input image data is then temporarily stored in the storage unit 4, for example, a buffer, which can store data of two or more frames. These processes are performed according to input of the image data and not necessarily synchronized with subsequent processes.

Figure 2:
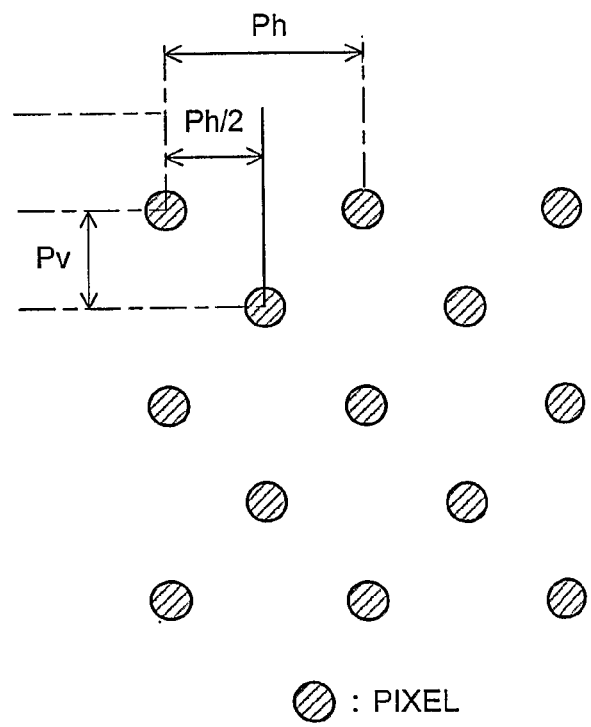
FIG. 2 is a schematic for illustrating pixels arranged in a delta array.
Figure 3:
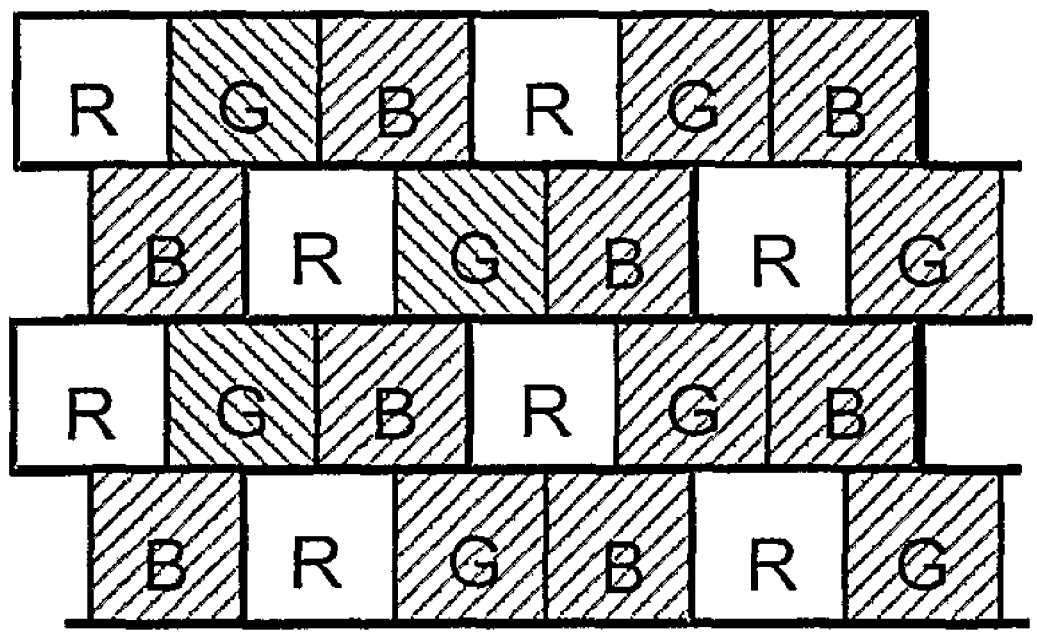
FIG. 3 is a schematic for illustrating the delta array in which display elements are provided for respective pixels of R, G, and B without constituting all color components at a same pixel position.

FIG. 2 is a schematic for illustrating pixels arranged in a delta array. FIG. 3 is a schematic for illustrating the delta array when display elements are provided for respective R, G, and B without constituting all color components at same pixel position.

As shown in FIG. 2, the delta array is an array in which lines at pitches of Pv in a vertical direction are provided with one line constituted by pixels arranged at pitches of Ph, and in which pixel positions are shifted by 0.5 Ph in a horizontal direction between two adjacent lines. In the delta array shown in FIG. 3, one pixel shown in FIG. 2 is constituted by arranging three display elements of R, G, and B transversely. A method for constituting one pixel shown in FIG. 2 by the display elements of respective color components is used in a liquid crystal display, a plasma display panel (PDP), an electro luminescence (EL) display or the like. Such an array appears to have a highest resolution among those equal in the number of pixels due to an increased number of pixels longitudinally and transversely.

If the display elements are arranged in the delta array of M×N pixels, the resolution converting unit 12 generates image data of 2M×N pixels. The image data of 2M×N pixels is image data in a square or rectangular parallelepiped array.

The output data generating unit 13 generates image data to be arranged in the delta array. Namely, the output data generating unit 13 calculates pixel data output from the display elements using the pixel data generated by the resolution converting unit 12. The present invention is characterized such that pixels to be output are arranged in the delta array, differently from the conventional techniques with which data on pixel points other than those in the delta array is abandoned without using it. According to the present invention, the data on pixel points that are conventionally abandoned is used for an operation process on data on pixel points in the delta array to be output.

The output data generating unit 13 operates the data on output pixel points including all points arranged in a square array, and outputs output pixel points in the delta array. Since the output data generating unit 13 does not output pixel points that cannot be output from the display elements in the delta array, it performs an apparent, so-called decimation. The output data generating unit 13 transmits the operated image data on the pixels in the delta array thus generated to the display unit 5, in which the display elements display the received image data.

Output data processing performed by the output data generating unit 13 is explained next. The output data processing performed by the output data generating unit 13 is a process for obtaining output pixel data so that the pixel array of the converted image data on the pixels arranged in the square or rectangular parallelepiped array after being subjected to the various image processing is matched to that of the output image data on the pixels arranged in the delta array. Alternatively, the output data processing can be performed while being included in the other image processing.

Figure 4:
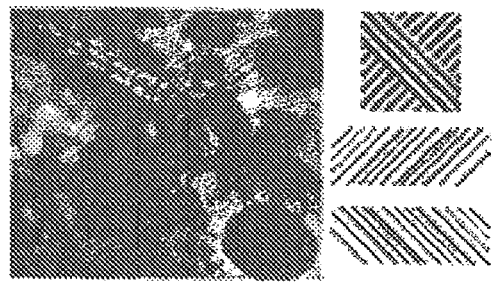
FIG. 4 is an example of a display image having a resolution of 2M×N pixels in a square or rectangular parallelepiped array.

FIG. 4 is an example of a display image having a resolution of 2M×N pixels in the square or rectangular parallelepiped array. In the example of FIG. 4, the display image includes 2M×N pixels arranged in the square or rectangular parallelepiped array and has N lines at pitches of Pv in the vertical direction, with one line constituted by 2M pixels at pitches of 0.5 Ph in the horizontal direction. This image is displayed as follows. Using display elements having 0.5 n line at pitches of 2 Pv in the vertical direction and having a resolution of M×N pixels in the square or rectangular parallelepiped array, with one line constituted by M pixels at pitches of Ph in the horizontal direction, the pixels are each shifted by ½ pitch in longitudinal and transverse directions and the resolution of the display elements is made twofold longitudinally and transversely. Namely, since this image is displayed at the resolution twice as high as that of the display elements, the image is a clear image without out-of-color registration. The present invention is intended to suppress the out-of-color registration and the like of the image using the display elements having the resolution half as high as that of the image so as to make the image close in image quality to this image having the twofold resolution.

Figure 5:
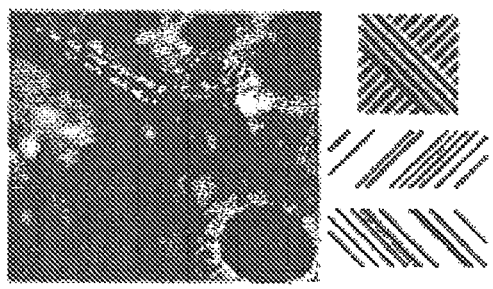
FIG. 5 is an example of a display image having a resolution of M×N pixels according to a conventional method.

FIG. 5 is an example of a display image having a resolution of M×N pixels according to a conventional method. In the example of FIG. 5, the display image has N lines at pitches of Pv in the vertical direction, includes M×N pixels in the delta array, which pixels are shifted by approximately 0.5 Ph in the horizontal direction between the two adjacent lines, with one line constituted by M pixels at pitches of Ph in the horizontal direction. The resolution of the image shown in FIG. 5 is, naturally, half as high as that of the image shown in FIG. 4. The image shown in FIG. 5 is obtained by diagonally shifting the pixels using display elements and by simply outputting data on pixel points in the delta array including all the points subjected to resolution-conversion according to the present invention without the operation process.

Figure 6:
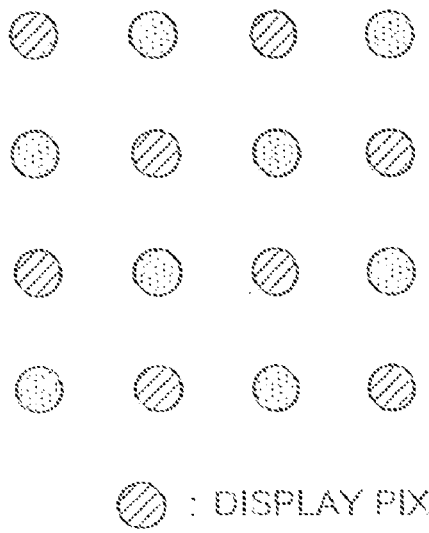
FIG. 6 depicts positions of pixels in a square array including those in the delta array to be output according to a conventional method.
Figure 7:
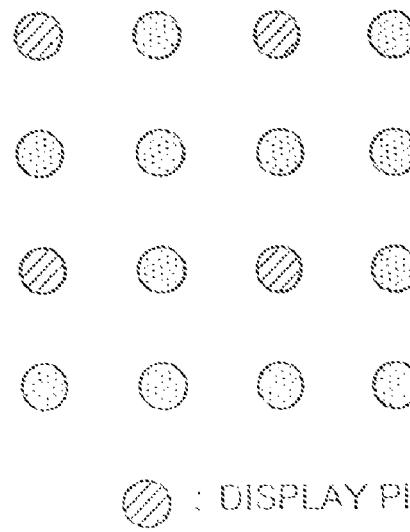
FIG. 7 depicts positions of pixels in the square array including those in the delta array to be output.

FIGS. 6 and 7 depict positions of pixels in the square array including those in the delta array to be output. In the image shown in FIG. 4, all the pixels shown in FIGS. 6 and 7 are used for the display image. In FIG. 5, pixel data represented by white circles is not used for the output image. Due to this, when the display image shown in FIG. 5 is compared with the display image shown in FIG. 4, it is seen that image data dropouts occur to the display image and that this causes degradation of image quality.

Figure 8:
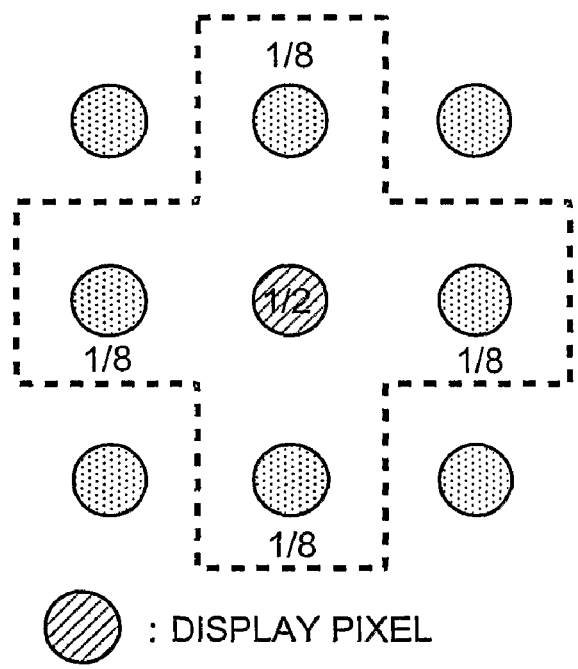
FIG. 8 is a schematic of a filter used to filter resolution-converted pixel data.

FIG. 8 is a schematic of a filter used to filter the resolution-converted pixel data. This filter is an example of the operation process performed on the pixel data. In FIG. 8, it is assumed that a horizontal pitch width between the pixels is 0.5 Ph and that a vertical pitch width is Pv. This is a process performed on the premise that the display pixels are arranged in the delta array. In this process, all the pixel data shown in FIG. 6 is used for the output image data at an equal rate. In FIG. 8, therefore, output pixel data Q is obtained while a pixel position of the pixel to be displayed and represented by a circle with slashes is assumed as (X, Y).

In this process, the resolution-converted pixel data among the converted image data is filtered on the following assumption. Pieces of the pixel data at the pixel position (X, Y) and pixel positions (X−0.5 Ph, Y), (X+0.5 Ph, Y), (X, Y−Pv), and (X, Y+Pv) adjacent to the pixel at the position (X, Y) longitudinally and transversely and represented by white circles are A, B, C, D, and E, respectively. A constant $\alpha 1$ is 0.2 to 0.8, and constants $\alpha 2$ to $\alpha 5$ are 0.05 to 0.2. By performing this filtering, a high resolution image free from the image dropouts, which are the conventional problem, can be displayed.

More preferably, the constant $\alpha 1$ is in a range from $0.5 \pm 0.1$ and the constants $\alpha 2$ to $\alpha 5$ are in a range from 0.125 (0.025. By so setting, the image which is less influenced by the pixel data dropouts or the like caused by the difference in the number of pixel between the converted image and the output image, and which has a quality closer to that of the display image obtained by shifting pixels longitudinally and transversely can be displayed. In this example, the instance of $\alpha 1 = 0.5$ and $\alpha 2 = \alpha 3 = \alpha 4 = \alpha 5 = 0.125$ is shown. In this instance, the output pixel data Q is expressed as $Q = 0.5 \cdot A + 0.125 \, (B+C+D+E)$.

Figure 9:
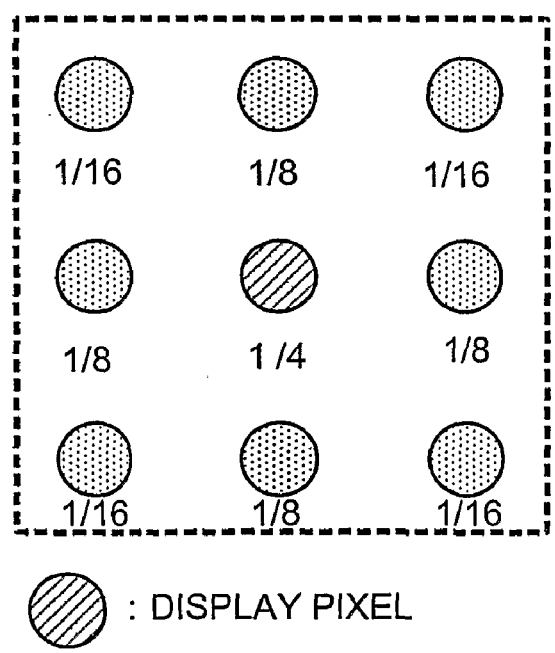
FIG. 9 is a schematic of a filter used by an output data generating unit for filtering.

FIG. 9 is a schematic of a filter used by the output data generating unit for the filtering. Pixels shown in FIG. 9 are arranged at a horizontal pitch width of 0.5 Ph and a vertical pitch width of Pv. This filtering is a process performed on the premise that pixel shifting is not performed. All the pixel data shown in FIG. 7 is used for the output image at an equal rate. Due to this, the output pixel data Q is obtained by performing the filtering on the following assumption. The pixel position of the pixel shown in FIG. 7 and represented by a circle with slashes is (X, Y). Among the converted image data, the pixel data at the pixel position (X, Y) and the pixel data at pixel positions (X−0.5 Ph, Y), (X+0.5 Ph, Y), (X, Y−Pv), and (X, Y+Pv) adjacent to the pixel at (X, Y) longitudinally and transversely, and that at (X−0.5 Ph, Y−Pv), (X+0.5 Ph, Y−Pv), (X+0.5 Ph, Y+Pv), and (X−0.5 Ph, Y+Pv) adjacent diagonally to the pixel at the position (X, Y) are A, B, C, D, E, F, G, H, and I, respectively. A constant $\beta 1$ is 0.1 to 0.8, constants $\beta 2$ to $\beta 5$ are 0.05 to 0.2, and constants $\beta 6$ to $\beta 9$ are 0 to 0.2.

By obtaining the output pixel data Q by thus filtering all the pixels, a high resolution image free from the image dropouts, which are conventional problems, can be displayed.

More preferably, the constant $\beta 1$ is 0.1 to 0.6, the constants $\beta 2$ to $\beta 5$ are 0.1 to 0.15, and the constants $\beta 6$ to $\beta 9$ are 0 to 0.1. By so setting, the image which is less influenced by the pixel data dropouts or the like caused by the difference in the number of pixels between the converted image and the output image, and which has a quality closer to the display image obtained by shifting the pixels longitudinally and transversely can be displayed.

In this example, the instance of $\beta 1=0.25$, $\beta 2=\beta 3=\beta 4=\beta 5=0.125$, and $\beta 6=\beta 7=\beta 8=\beta 9=0.0625$ is shown. In this instance, the output pixel data Q is expressed as $Q=0.25 \cdot A+0.125 (B+C+D+E)+0.0625 (F+G+H+I)$.

In this process, the pixel data on the pixels that are located longitudinally and transversely to the pixel represented by the circle with slashes, and that are represented by white circles are used when two surrounding pixels are obtained. The pixel data on the pixels that are located diagonally adjacent to the pixel represented by the circle with slashes, and that are represented by white circles are used when four surrounding pixels are obtained. The pixel data on the pixel represented by the circle with slashes is used only when the pixel itself is obtained. Therefore, all the pixel data on the converted image is reflected in the output image and used for the output image.

In this process, the pixel data on the pixels represented by the white circles is used when the four surrounding pixels are obtained and that on the pixel represented by the circle with slashes is used only when the pixel itself is obtained. Therefore, all the pixel data on the converted image is used to determine the output image. The image data is thus reflected in not only the pixel data to be output but also the pixel data adjacent thereto. The pixel data that can express an entire image with a high quality while out-of-color registration is suppressed can be obtained.

Figure 10:
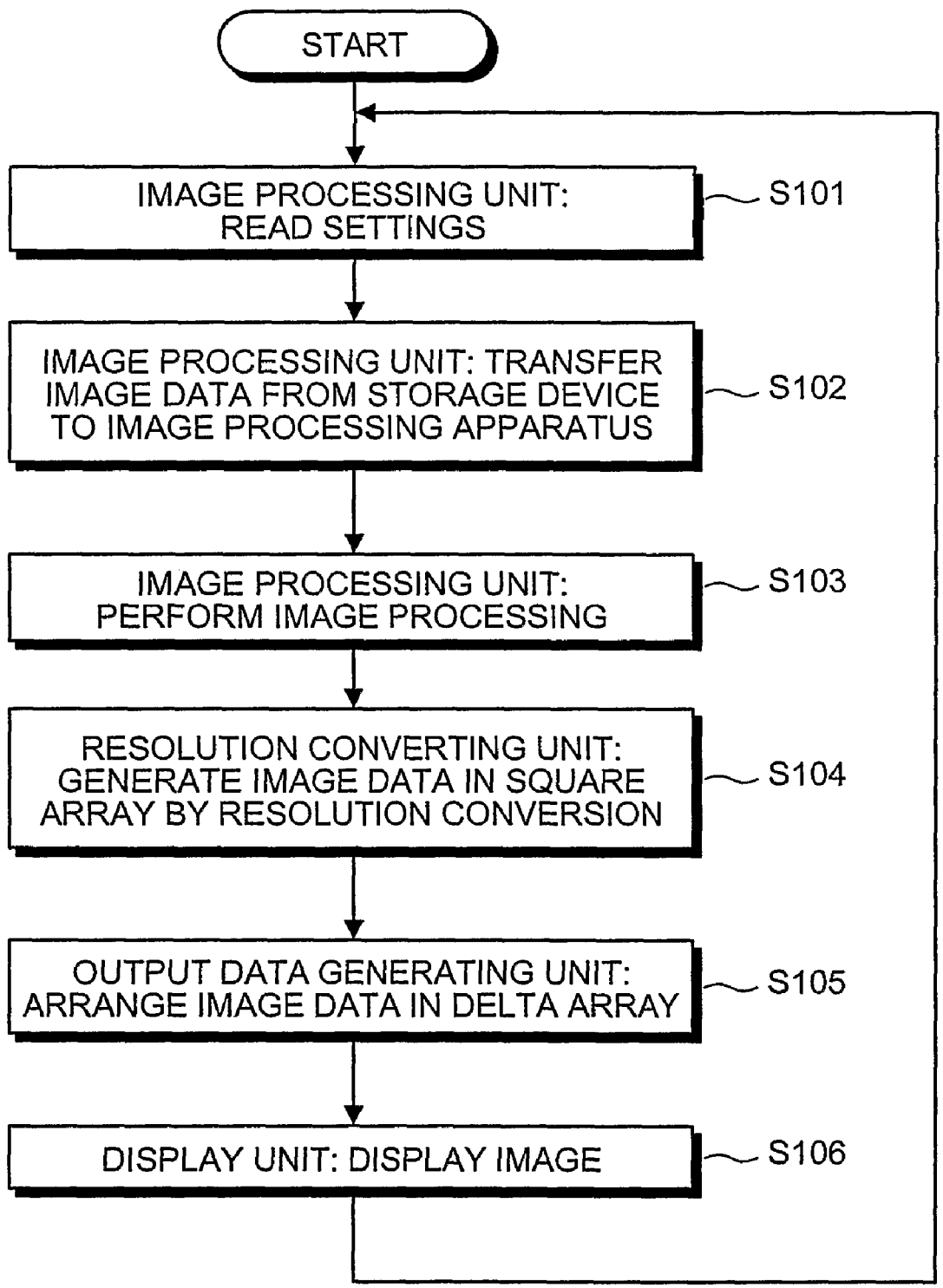
FIG. 10 is a flowchart of an image processing according to the first embodiment.

FIG. 10 is a flowchart of an image processing according to the first embodiment. The image processing unit 11 reads various settings for image processing (step S101), transfers the image data from the storage unit 4 to the image processing apparatus 10 (step S102), and performs various image processing including a gamma correction process (step S103). The resolution converting unit 12 then performs a resolution conversion process on the image data that has been subjected to the various image processing, generates image data in a square array, and performs an operation process such as a filtering on the generated image data in the square array (step S104). The resolution converting unit 12 arranges the image data, which has been subjected to the operation process, in a delta array and outputs the image data in the delta array to the display unit 5 (step S105). The display unit 5 displays the image (step S106).

FIG. 11 depicts a display image when this filtering is performed and the diagonal shifting is performed on the pixels similarly to FIG. 5. By performing these processes, all the pixel data on the converted image is used for the display image. As compared with the image, as shown in FIG. 5, which is displayed by the conventional method which does not use these processes, the image can be displayed with a higher quality and a higher resolution. Furthermore, even as compared with the display image (having the twofold resolution) obtained by shifting the pixels longitudinally and transversely as shown in FIG. 4, the display image closer thereto in quality and resolution can be obtained despite a slight blur. The method for generating the pixel data corresponding to the pixels in the delta array included in those in the square array from the resolution-converted pixel data on the pixels in the square array has been explained so far.

As can be seen, the image processing apparatus capable of improving the quality and the resolution of the image by filtering the resolution-converted image data can be realized. As compared with the conventional techniques with which the pixel data on the pixels at positions corresponding to the delta array is extracted and output without being filtered, the image processing apparatus can provide the high quality image. When such an image processing apparatus is incorporated into the image display apparatus, the image display apparatus that can display the image by similarly improving the quality and the resolution of the image can be realized.

Figure 12:
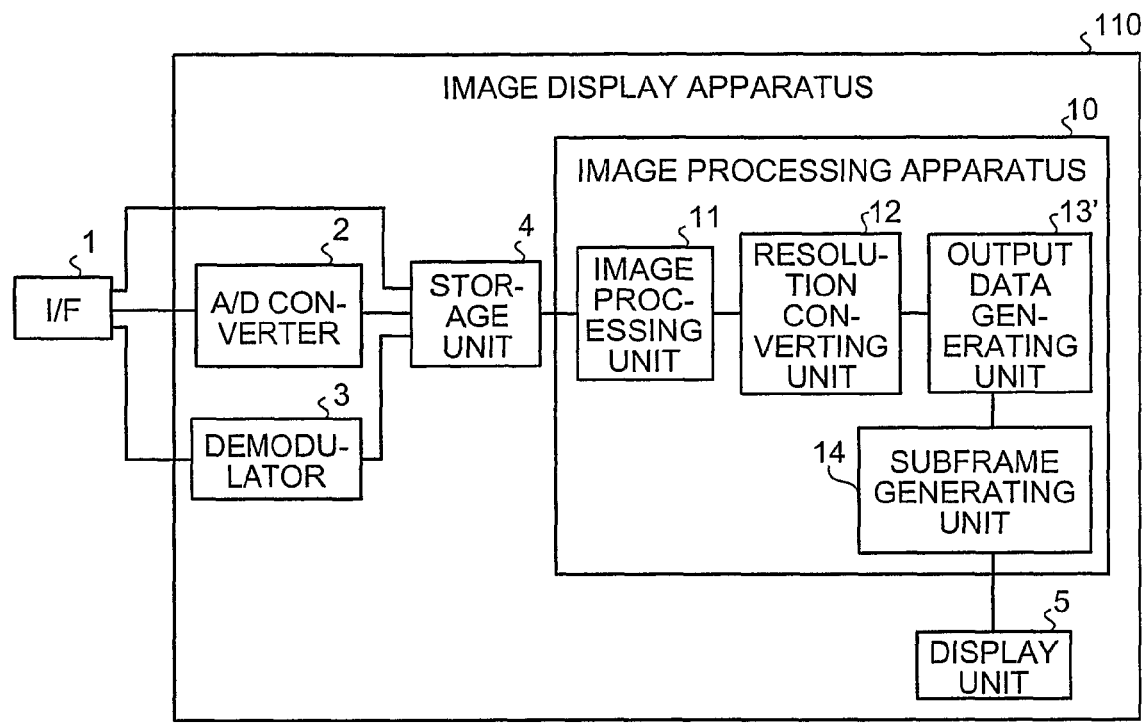
FIG. 12 is a block diagram of an image processing apparatus according to a second embodiment of the present invention.

FIG. 12 is a functional block diagram of an image processing apparatus according to a second embodiment of the present invention. An image display apparatus 110 according to the second embodiment differs from that according to the first embodiment as follows. An image processing apparatus 10' included in the apparatus 110 additionally includes a subframe generating unit 14. The image processing apparatus 10' includes an output data generating unit 13' different in output data generating method from the output data generating unit 13. The image display apparatus 110 includes a display unit 5' that displays two subframes generated by the subframe generating unit 14 as one frame visually.

The resolution converting unit 12 performs a resolution conversion process on image data after the image processing unit 11 performs an image processing thereon. The resolution converting unit 12 generates image data in a square or rectangular parallelepiped array to be matched to the resolution of the display unit 5' of the image display apparatus 100'.

The resolution converting unit 12 generates image data of 2M×N pixels when display elements are in a delta array of M×N pixels or when the number of pixels of display elements is M×0.5N and pixel shifting is performed on the pixels. It is noted that the image data on 2M×N pixels is image data in the square or rectangular parallelepiped array. In addition, the number of pixels of the display elements is assumed as M×0.5N when the pixel shifting is performed.

The output data generating unit 13' generates image data on pixels in the delta array. Namely, the output data generating unit 13 calculates pixel data output from the display elements using the pixel data generated by the resolution converting unit 12 and dos not output pixel points that cannot be output from the display elements. Therefore, the output data generating unit 13' performs an apparent decimation in which all but the output pixel points, i.e., pixel points for the delta array are decimated from the pixel points apparently processed based on all the pixel points. The output data generating unit 13' transmits the image data on the pixels in the delta array thus generated to the display unit 5', in which the display elements display the received image data.

Figure 13:
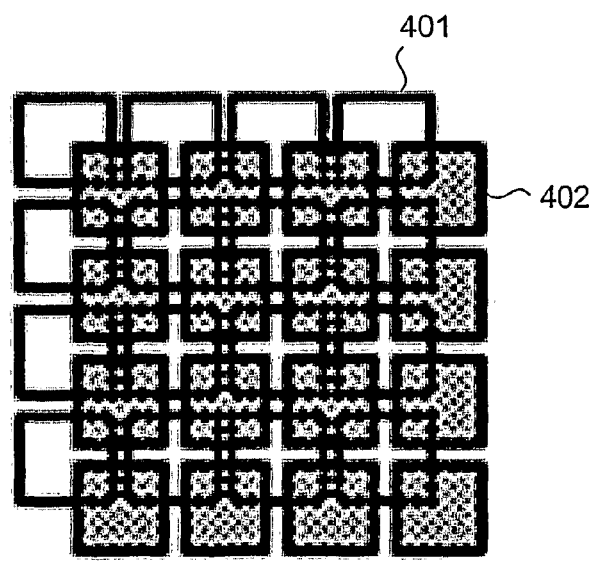
FIG. 13 is a schematic for illustrating pixels of a display element capable of controlling a light according to generated output image data and constituted by a plurality of pixels, and a pixel displacement operation.

FIG. 13 is a schematic for illustrating pixels of a display element capable of controlling a light according to generated output image data and constituted by a plurality of pixels, and a pixel displacement operation. Relative to a plurality of pixels 401 shown in FIG. 13, pixels at positions displaced by half a distance from display positions of the pixels 401 longitudinally and transversely are a plurality of pixels 402. Namely, the pixels 402 are diagonally adjacent to the pixels 401 and obtained by shifting the pixels 401. The pixels to be displayed are displaced from the pixels 401 to 402 within a period of one field, and an image of one field is displayed as a plurality of sub-fields at each position, thereby forming an image.

As pixel shifting means for shifting pixels, an optical element (a rotating plate or a light deflector or the like) capable of shifting an emission light to be parallel to an incident light, rotating the incident light at a certain angle, or changing over optical paths by a combination of the shifting and the rotation is employed. By thus performing the pixel shifting, a pixel array equivalent to that shown in FIG. 14 can be constituted. That is, when the number of pixels 401 is M×N×0.5, it visually appears that M×N pixels are displayed within one frame by these two subframes.

Output data processing performed by the output data generating unit 13' is explained next. The output data processing performed by the output data generating unit 13' is a process for obtaining output pixel data so that the pixel array of the converted image data on pixels in the square or rectangular parallelepiped array after being subjected to the various image processing is matched to that of the output image data on the pixels in the delta array. Alternatively, the output data processing can be performed while being included in the other image processing.

Figure 14:
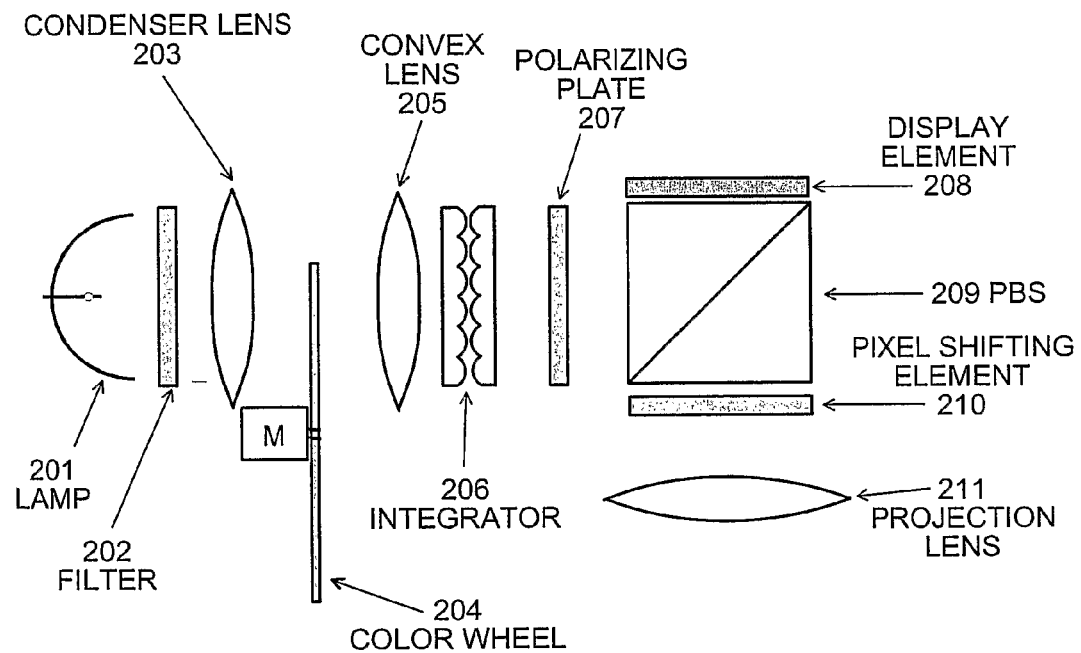
FIG. 14 is a schematic for explaining configuration of an image display apparatus including a light deflector that diagonally shifts pixels and a single display element.

FIG. 14 is a configuration diagram of an image display apparatus including a light deflector that diagonally shifts pixels and a single display element. A light source 201 is a combination of an extra-high pressure mercury lamp and a parabolic reflector.

Two convex lenses 203 and 205 for returning a light perpendicular to the condenser lens 203 and an integrator 206 thereto are provided in front of the integrator 206, a color wheel 204 at a position at which the light located between the lenses 203 and 205 is collected so as to change a wavelength band of the light according to image data on each color component. The integrator 206 makes the light emitted from the light source uniform. As a display element 208, a reflection liquid crystal display panel is employed.

A polarizing beam splitter (PBS) 209 separates an illumination light from an image light. A pixel shifting element 210 is constituted by a light deflector or the like and controlled by a control circuit. The pixel shifting element 210 shifts the image light by a shift amount set in a diagonal direction of the pixel array. A projection lens 211 projects the light passing through the pixel shifting element 210 onto a screen so as to display an image.

In this image display apparatus, an image frame is constituted by time-divided subframes, the divided subframes are constituted for the respective color components, and the color wheel 204 is controlled according to each color component. In this image display apparatus, the light shifting element or light deflector 210 operates for every subframe, and image information corresponding to a display position according to an operating state of the light deflector 210 is displayed on the image display element. It is thereby possible to display an image with an apparent high precision and reduce a cost of the image display apparatus.

Figure 15:
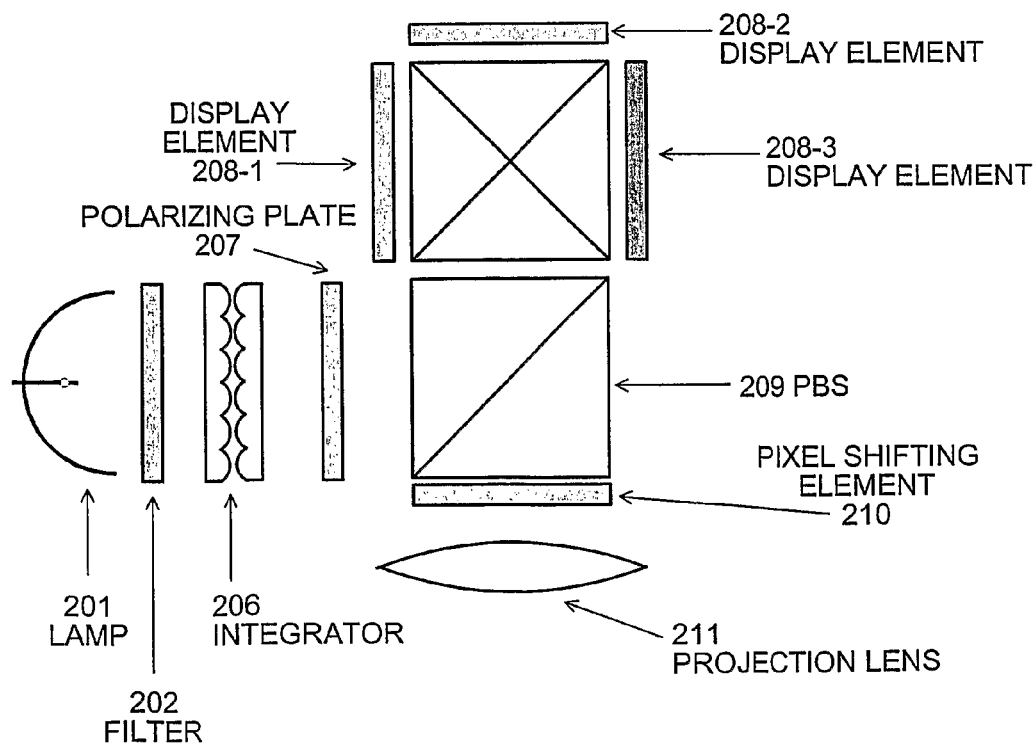
FIG. 15 depicts a configuration of an image display apparatus including three display elements.

FIG. 15 depicts a configuration of an image display apparatus including three display elements. Normally, the apparatus that includes three display elements is referred to as "three-element apparatus". As the display elements, three reflection liquid crystal display panels are used (for color components of R, G, and B, respectively).

Similarly to the single-element display apparatus, a lamp that is a combination of an extra-high pressure mercury lamp and a parabolic reflector is employed as a light source. Using an integrator that functions to make a light uniform and a polarizing plate that functions to make directions of polarized lights uniform, i.e., one direction, the light is illuminated almost uniformly.

The light passing through the integrator 206 and the polarizing plate 207 is reflected or transmitted by dichroic mirrors in different wavelength bands (corresponding to red, green, and blue components), respectively. For instance, the blue reflecting dichroic mirror reflects a blue component and transmits green and red components. The light separated into the respective color components is reflected by the PBS (polarizing beam splitter) 209 and incident on the pixel shifting element 210.

After the image light is shifted by the pixel shifting element by a shift amount set in the diagonal direction of the pixel array, the shifted light is projected onto a screen through a projection lens, thereby displaying an image. An image frame is constituted by time-divided subframes, the light shifting element or light deflector 210 operates for every subframe, and image information corresponding to a display position according to an operating state of the light deflector 210 is displayed on the image display elements.

Figure 16:
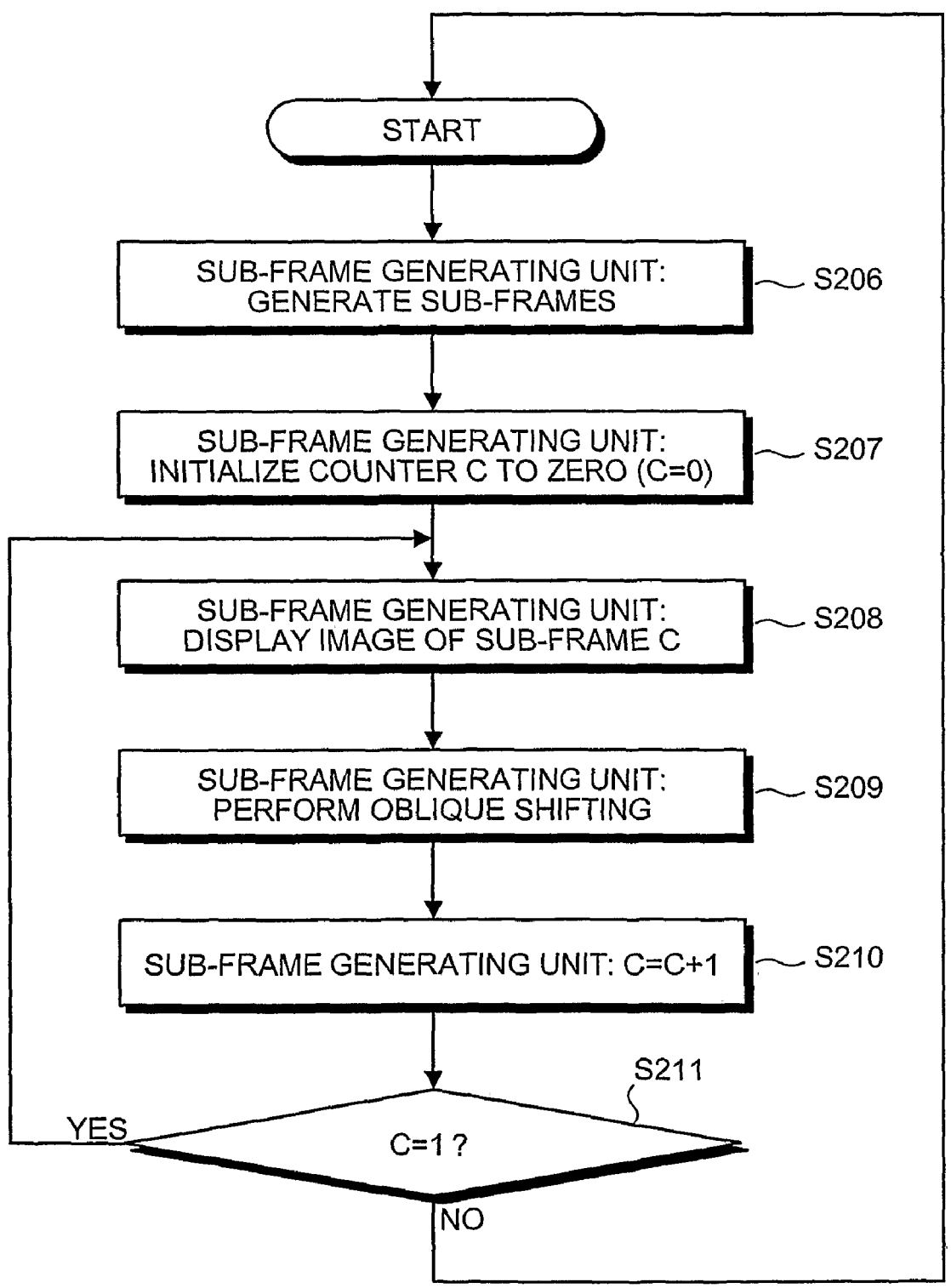
FIG. 16 is a flowchart of a pixel diagonal shifting process.

FIG. 16 is a flowchart of a pixel diagonal shifting process. Steps up to a step of causing the output data generating unit 13' to generate the image data on pixels in the delta array are the same as the steps S101 to S105 according to the first embodiment. Therefore, steps S206 and the following will be explained herein. The subframe generating unit 14 generates subframes (at the step S206) and initializes a counter to zero (C=0) (step S207). The display unit 5' displays an image of the subframe C(=0) (step S208), performs a pixel diagonal shifting (step S209), and replaces C by C+1 (=1 in this example) (step S210). It is determined whether C is 1 (step S211). When it is determined that C is 1 ("Yes" at the step S211), the process returns to the step S208. The same cycle is repeated and it is determined that C is not 1 this time ("No" at the step S211). The process then returns to the first step S101 (FIG. 10) and the cycle is repeated. The display unit 5' thus displays the image while generating the subframes.

In this embodiment, two subframes are generated according to a time of display. The image data on these subframes is transmitted to the display unit 51, in which an operation of the pixel shifting element is synchronized with the display of the subframes by the display elements, thereby displaying the image. In this embodiment, the image display apparatus and the image processing apparatus are given only for illustrated purposes and types of these apparatuses are not limited thereto.

By thus configuring, the image display apparatus can display an image apparently with a high precision. In addition, this configuration can reduce the cost of the image display apparatus. Furthermore, this configuration makes it possible for a plurality of display elements to display the respective color components and makes it unnecessary to display the color components while dividing the time of display according to the color components. Accordingly, the time of display for each color component is increased and light utilization efficiency is enhanced.

The filter used by the output data generating unit for the filtering as shown in FIG. 9 can be similarly used in the second embodiment. Since the filter and the filtering are the same as those explained in the first embodiment, they will not be explained herein.

Considering that the human visible sensitivity to the green component is the highest, the image display apparatus is configured to display image data on the green component that has the highest influence on the resolution at two pixel positions. By so configuring, it is possible to, attain the effect of improving the resolution of the image with a simple configuration and without shifting pixels of each color component. In this embodiment, an instance of shifting pixels of only the green component in the diagonal direction using the pixel shifting element is explained.

It is assumed that the pixels of the green component to be shifted are displayed in the array similar to the pixel array of the display element shown in FIG. 6 (the delta array). It is also assumed that the pixels of the red and blue components are displayed in the array similar to the pixel array of the display element shown in FIG. 7 (the square array). The pixels of the green components are subjected to the filtering using the filter shown in FIG. 8 and those of the other color components are subjected to the filtering using the filter shown in FIG. 9, thereby generating a display image.

Figure 17:
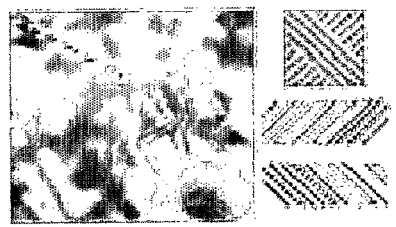
FIG. 17 depicts a display image generated by performing filtering differently between a green component and other blue and red components.
Figure 18:
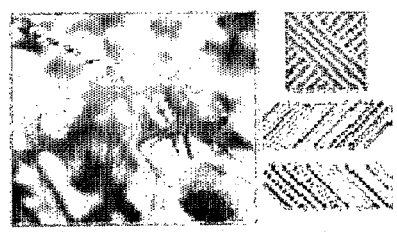
FIG. 18 depicts an image generated by the conventional method with which the different filtering is not performed on the green, red, and blue components.
Figure 19:
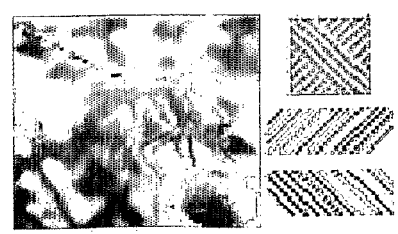
FIG. 19 depicts an image generated by performing the filtering shown in FIG. 8 on all the color components.
Figure 20:
FIG. 20 depicts images generated by performing the filtering shown in FIG. 9 on all the color components.

FIG. 17 depicts a display image generated by performing filtering differently between the green component and the other blue and red components. FIG. 18 depicts at image generated by the conventional method with which the different filtering is not performed on the green, red, and blue components. FIG. 19 depicts an image generated by performing the filtering shown in FIG. 8 on all the color components. FIG. 20 depicts images generated by performing the filtering shown in FIG. 9 on all the color components.

These display images are generated while performing white balancing on all the color components. However, when the pixel diagonal shifting is performed, the white balancing on the display image does hardly cause a problem for the following reasons. The light from the light source for the color component to be subjected to the pixel shifting is divided, and a different display element is used for the shifting target color component.

However, when only one display element is used as shown in FIG. 14, the following methods can be adopted. (1) a method for changing the time of display for the display element, (2) a method for changing a light transmittance by operating the color component subjected to the pixel shifting by the color wheel while making the time of display for the display element constant, (3) a method for reducing image data on the color component to be subjected to the pixel shifting, and the like.

In the image shown in FIG. 18, colors of the image are clear; however, dropouts, large jaggies, and out-of-color registration of green and peach occur to the image. In the image shown in FIG. 19, all the pixel data on the green component is used for the display image whereas a part of the converted image data on the other color components is not used for the display image, resulting in occurrence of pixel data dropouts. This shows that out-of-color registration occurs to the image shown in FIG. 19 although the image shown in FIG. 19 is higher in quality than that shown in FIG. 18.

In the image shown in FIG. 20, the rate of using the pixel data on the green component varies and the pixel data on the green component is influenced by the pixel data on the adjacent display pixels. Due to this, although the out-of-color registration is reduced to a negligible extent, the image slightly blurs.

In the image shown in FIG. 17, all pieces of the pixel data are used at the equal rate and the pixel data is not influenced by the pixel data on the adjacent display pixels. As compared with the display image shown in FIG. 12, the image blur is reduced and the image can be displayed with a high quality and a high resolution so that the out-of-color registration is negligible even at the distance at which the pixel structure is recognizable.

As can be seen, it is possible to provide the image display apparatus and the image processing apparatus capable of reducing the out-of-color registration caused by improving the resolution of only the green component and of displaying the image with the high quality and the high resolution so that the out-of-color registration is negligible even at the distance at which the pixel structure of the display image is recognizable, by using different filtering means suited for the array of the pixels to be output depending on whether the pixel diagonal shifting is performed.

If the single-element display apparatus that displays all the color components using one display element as shown in FIG. 14 is used and the pixel shifting is performed on all the color components, it is necessary to display the image six times because of the need to display three colors at the two respective display positions. According to this embodiment, by contrast, it suffices to display the image four times in all, i.e., once for each of three colors and once for green (or once for each of red and blue and twice for green). Therefore, a sum of reaction time between the times at which the respective colors are displayed is reduced and the light utilization efficiency is enhanced.

Furthermore, when the number of original display pixels of the green component is set different from those of the other components instead of performing the pixel shifting performed in this embodiment, it is unnecessary to increase the number of pixels of the display element for all the color components. Therefore, a simple configuration with fewer wirings of the display element can be provided, making it possible to attain the effect of improving the resolution of the image at low cost. This can also facilitate improving the resolution of the display element itself.

Figure 21:
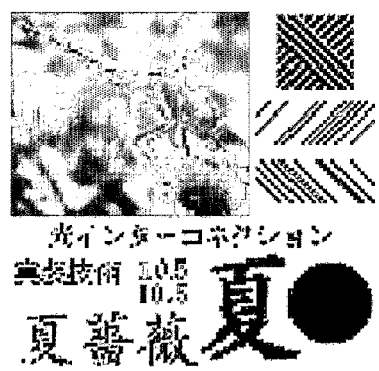
FIG. 21 depicts an image obtained by diagonally shifting the pixels of the green component among the color components to be displayed at two positions, and by displaying the red and blue components each at one different position from those of the green components.

FIG. 21 depicts an image obtained by diagonally shifting the pixels of the green component among the color components to be displayed at two positions, and by displaying the red and blue components each at one different position from those of the green components. In the image shown in FIG. 17, out-of-color registration occurs between green and peach. In the image shown in FIG. 21, out-of-color registration occurs between blue and orange. Since the human visible sensitivity to the green component is the highest, a person is apt to recognize the out-of-color registration shown in FIG. 17 rather than that shown in FIG. 21. In addition, the degradation of the image quality is smaller in the image shown in FIG. 18.

If one display element included in the image display apparatus shown in FIG. 14 is used to display the image, the display positions of the pixels can be displaced using the pixel shifting means by locating each of the red component and the blue component at a different one position. If the rotating plate is used as the pixel shifting means, the display element and the rotating plate can operate at an equal rate. This can dispense with a complicated control over the pixel shifting means and facilitate the control.

If the pixel shifting means is a light deflector using a liquid crystal, the liquid crystal is driven by an AC voltage. An applied voltage is, therefore, DC-balanced. Accordingly, causes for reducing a life of the light deflector such as a light leakage caused by uneven inclination of the liquid crystal and electrolysis of the liquid crystal less occur, making it possible to extend the life of light deflector.

Figure 22:
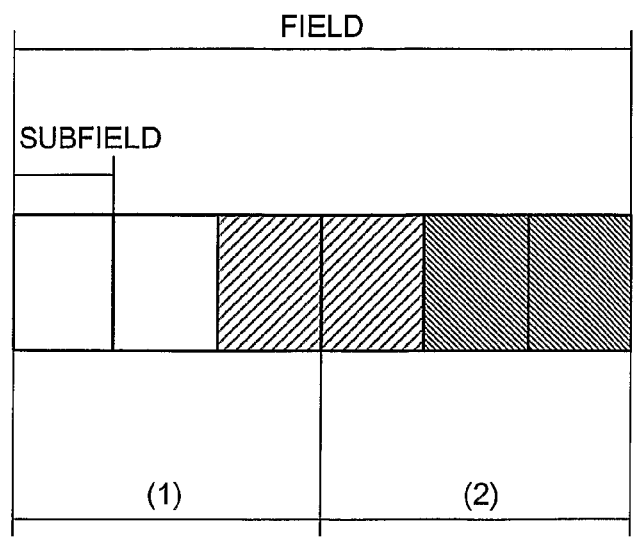
FIG. 22 a schematic for illustrating an operation of making a time of display for a color component that is not to be subjected to the pixel shifting twice as long as that of a color component to be subjected to the pixel shifting.

FIG. 22 a schematic for illustrating an operation of making a time of display for a color component that is not to be subjected to the pixel shifting twice as long as that of a color component to be subjected to the pixel shifting. The display time of each color component is set almost equally. In FIG. 22, the respective color components displayed by the display elements and pixel shifting timings are shown. In FIG. 22, the red and blue components are displayed at different positions (1) and (2), respectively and the green component is displayed to extend over two positions. In this case, if the display time of each of the red and blue components is set almost equal to the time of displaying the green component once, the red and blue components are displayed twice at the same display positions, respectively. The two display operations are controlled as one set. By thus configuring, if a maximum gradation expression of the display element is, for example, 256 gradations, each color component can be expressed with 256 gradations. By integrally controlling the respective color components, the red and blue components can be expressed with twice as many as gradations, i.e., 511 gradations. It is thereby possible to increase the number of gradations of the color components that are not subjected to the pixel shifting and express the output image with more gradations.

It is preferable that the time of display for the display element for each of the color components at each display-position by the pixel shifting is set substantially equal. By so setting, it is possible to display an image free from out-of-color registration at a high quality and a high resolution even at a visible distance at which the pixel structure is recognizable.

Preferably, at least the green component displayed by the display element is displayed after being displaced by the pixel shifting element. By doing so, the image display apparatus can display a high resolution image at low cost. In addition, the light utilization efficiency can be enhanced.

Preferably, the time of display for the display element for the green component is shorter than those for the other color components. By setting so, an image with a good white balance can be displayed.

It is also preferable that a dimmer function that reduces a light quality of the green to be smaller than those of the other color components is further provided. By doing so, the image with a good white balance can be displayed while making the display timings of the display element for the respective color components constant.

Preferably, the display element displays the colors other than the green to be adjacent to green pixels and located alternately at different display positions, respectively. By changing the out-of-color registration of the green to which the human visible sensitivity is the highest to those of the other colors inferior to the green in human visible sensitivity, the degradation of the image quality due to the out-of-color registration can be suppressed.

Preferably, the time of the display element of outputting the respective pieces of output pixel data to the display positions is made substantially equal by adjusting the arrangement of the color components that are not displaced among all the output pixel data and by adjusting the light quantities of the respective color components. By making the time of locating the respective pieces of output pixel data at the display positions substantially equal by adjusting the arrangement of the color components that are not displaced among all the output pixel data and by adjusting the light quantities of the respective color components, and by allowing the pixel shifting operation to be performed at an AC voltage, the operation of the pixel shifting means can be made uniform to realize a regular operation. Accordingly, simplification and facilitation of the control over the pixel shifting means, and extension of the life of the means can be realized.

Preferably, the time of display for the display element for all the color components is set substantially equal, and the time of display for the color component that is not subjected to the pixel shifting is set twice as long as that for the color component to be subjected to the pixel shifting. By making the time of display for all the color components substantially equal, displaying the color component that is not subjected to the pixel shifting for a time twice as long as that for the color component subjected to the pixel shifting, and controlling the pixel shifting with the gradations matched to one another, it is possible to realize an increase in the number of gradations of the color component that is not subjected to the pixel shifting.

Figure 23:
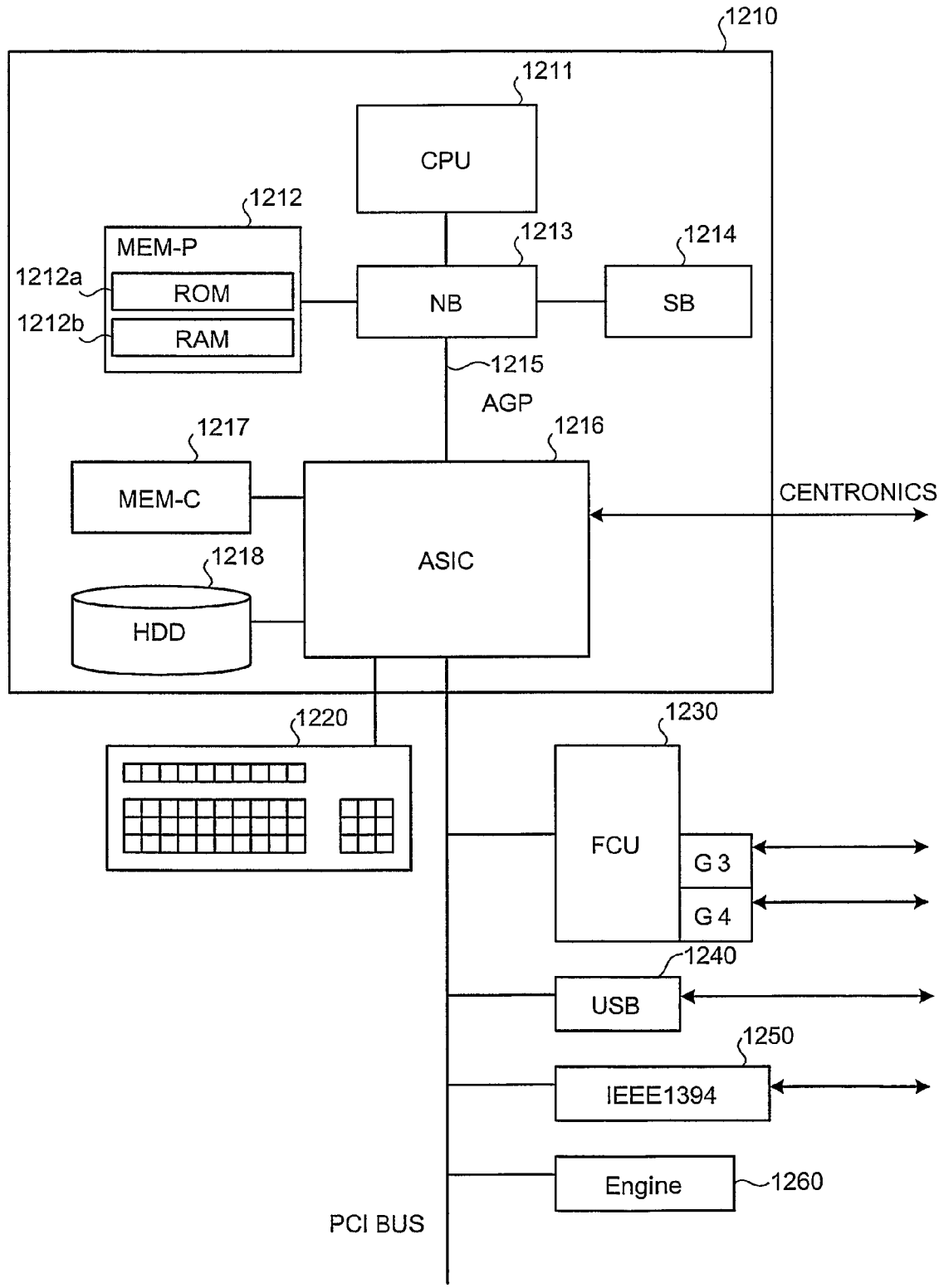
FIG. 23 is a block diagram of a hardware configuration of the image processing apparatus according to the first embodiment.

FIG. 23 is a block diagram of a hardware configuration of the image processing apparatus according to the first embodiment. The hardware configuration of the image processing apparatus according to the first embodiment is explained with reference to FIG. 23. A central processing unit (CPU) 1101 controls the image processing apparatus. A read-only memory (ROM) and a hard disk drive (HDD) 1102 are read-only memories used to store programs and data. A random-access memory (RAM) 1103 is a writable and readable memory used as a memory to expand the programs and the data, a memory to draw an image during the image processing or the like.

An image processing program executed by the image processing apparatus according to the first embodiment can be configured to be provided by being recorded in a computer readable recording medium such as a compact-disc read-only memory (CD-ROM), a flexible disk (FD), a compact-disc recordable (CD-R) or a digital versatile disk (DVD) as a file in an installable form or an executable form.

Furthermore, the image processing program executed by the image processing apparatus according to the first embodiment can be configured to be provided by being stored in a computer connected to a network such as the Internet and downloaded to the image processing apparatus through the network. Alternatively, the image processing program can be provided or distributed through the network such as the Internet.

The image processing program executed by the image processing apparatus according to the first embodiment is configured as a module that includes the respective units (the image processing unit, the resolution converting unit, the output data generating unit and the like). As actual hardware, the CPU reads the image processing program from the ROM and executes the program, whereby the respective units are loaded to a main storage device and the image processing unit, the resolution converting unit, the output data generating unit and the like are generated on the main storage device.

INDUSTRIAL APPLICABILITY

As explained above, an image processing apparatus, an image display apparatus, an image processing method, and a computer product according to embodiments of the present invention are useful for processing pixel data of a display image, and are particularly suitable for equipments such as a projector, a copying machine, and a printer that is required to suppress out-of-color registration to obtain a high quality image.

The invention claimed is:

1. An image processing apparatus that performs resolution conversion on image data to output to a display unit, comprising:
   a resolution converting unit configured to perform resolution conversion on the image data to generate pixel data having a resolution a times as high as a resolution of the display unit, where $\alpha>1$;
   an image processing unit configured to perform an image processing on the pixel data; and
   a decimation unit configured to decimate the pixel data on which the image processing has been performed, to have a resolution equal to or lower than the resolution of the display unit, and to output decimated data to the display unit, wherein
   the decimation unit is configured to output, to the display unit, pixel data of M×N pixels formed in a delta array, the pixel data having N lines of pixel lines each of which includes M pieces of pixels arranged in a horizontal direction at a pitch Ph, the pixel lines arranged in a vertical direction at a pitch Pv, the delta array in which two pixel lines adjacent to each other are shifted by approximately 0.5 Ph in the horizontal direction,
   the resolution converting unit is configured to generate the pixel data of 2M×N pixels by combining a first sub-output image of M×N pixels having N lines of pixel lines each of which includes M pieces of pixels arranged in a horizontal direction at a pitch Ph, the pixel lines arranged in a vertical direction at a pitch Pv, the first sub-output image in which two pixel lines adjacent to each other are shifted by approximately 0.5 Ph in the horizontal direction, and a second sub-output image of M×0.5N pixels having 0.5N lines of pixel lines each of which includes M pieces of pixels arranged in a horizontal direction at a pitch Ph, the pixel lines arranged in a vertical direction at a pitch Pv×2,
   the image processing unit is configured to perform the image processing on the pixel data of the 2M×N pixels, and
   the decimation unit is configured to decimate the pixel data of the 2M×N pixels to the pixel data of M×N pixels.

2. An image processing apparatus that performs resolution conversion on image data to output to a display unit, comprising:
   a resolution converting unit configured to perform resolution conversion on the image data to generate pixel data having a resolution a times as high as a resolution of the display unit, where $\alpha>1$;
   an image processing unit configured to perform an image processing on the pixel data; and
   a decimation unit configured to decimate the pixel data on which the image processing has been performed, to have a resolution equal to or lower than the resolution of the display unit, and to output decimated data to the display unit, wherein
   the decimation unit is configured to output, to the display unit, pixel data of M×N pixels formed in a delta array, the pixel data having N lines of pixel lines each of which includes M pieces of pixels arranged in a horizontal direction at a pitch Ph, the pixel lines arranged in a vertical direction at a pitch Pv, the delta array in which two pixel lines adjacent to each other are shifted by approximately 0.5 Ph in the horizontal direction,
   the resolution converting unit is configured to generate the pixel data of 2M×N pixels by combining a first sub-output image of M×N pixels having N lines of pixel lines each of which includes M pieces of pixels arranged in a horizontal direction at a pitch Ph, the pixel lines arranged in a vertical direction at a pitch Pv, the first sub-output image in which two pixel lines adjacent to each other are shifted by approximately 0.5 Ph in the horizontal direction, and a second sub-output image of M×0.5N pixels having 0.5N lines of pixel lines each of which includes M pieces of pixels arranged in a horizontal direction at a pitch Ph, the pixel lines arranged in a vertical direction at a pitch Pv×2,
   the image processing unit is configured to perform the image processing on the pixel data of the 2M×N pixels,
   the decimation unit is configured to decimate the pixel data of the 2M×N pixels to the pixel data of M×N pixels, and
   the image processing includes a first filtering that is performed on the first sub-output image by a first filtering unit, and a second filtering that is performed on the second sub-output image by a second filtering unit.

3. An image processing apparatus that performs resolution conversion on image data to output to a display unit, comprising:
   a resolution converting unit configured to perform resolution conversion on the image data to generate pixel data having a resolution a times as high as a resolution of the display unit, where $\alpha>1$;
   an image processing unit configured to perform an image processing on the pixel data; and
   a decimation unit configured to decimate the pixel data on which the image processing has been performed, to have a resolution equal to or lower than the resolution of the display unit, and to output decimated data to the display unit, wherein
   the image processing unit is configured to plot pixels of the image data on which the resolution conversion is performed and pixels of image data to be output to the display unit in coordinates, and
   the image processing unit includes a first filtering unit configured to generate pixel data of output image data located at coordinates (X, Y) using $\alpha 1 \cdot A + \alpha 2 \cdot B + \alpha 3 \cdot C + \alpha 4 \cdot D + \alpha 5 \cdot E$, where A, B, C, D, and E are pixel data of the image data, on which the resolution conversion is performed, located at coordinates (X, Y), (X−0.5Ph, Y), (X+0.5Ph, Y), (X, Y−Pv), and (X, Y+Pv) respectively in the coordinates, and $\alpha i$ is a constant that is not zero when i is 1, 2, 3, 4, or 5, and
   the constant $\alpha 1$ is approximately 0.5 and the constants $\alpha 2$ to $\alpha 5$ are approximately 0.125.

4. An image processing apparatus that performs resolution conversion on image data to output to a display unit, comprising:
   a resolution converting unit configured to perform resolution conversion on the image data to generate pixel data having a resolution a times as high as a resolution of the display unit, where $\alpha>1$;
   an image processing unit configured to perform an image processing on the pixel data; and
   a decimation unit configured to decimate the pixel data on which the image processing has been performed, to have a resolution equal to or lower than the resolution of the display unit, and to output decimated data to the display unit, wherein
   the image processing unit is configured to plot pixels of the image data on which the resolution conversion is performed and pixels of image data to be output to the display unit in coordinates,
   the image processing unit includes a second filtering unit configured to generate pixel data of output image data located at coordinates (X, Y) using $\beta 1 \cdot A + \beta 2 \cdot B + \beta 3 \cdot C +$ $\beta 4 \cdot D + \beta 5 \cdot E + \beta 6 \cdot F + \beta 7 \cdot G + \beta 8 \cdot H + \beta 9 \cdot I$, where A, B, C, D, E, F, G, H, and I are pixel data of the image data, on which the resolution conversion is performed, located at coordinates (X, Y), (X−0.5Ph, Y), (X+0.5Ph, Y), (X, Y−Pv), (X, Y+Pv), (X−0.5Ph, Y−Pv), (X+0.5Ph, Y−Pv), (X−0.5Ph, Y+Pv), and (X+0.5Ph, Y+Pv) respectively in the coordinates, and βi is a constant that is not zero when i is 1, 2, 3, 4, 5, 6, 7, 8, or 9, and the constant β1 is approximately 0.25, the constants β2 to β5 are approximately 0.125, and the constants β6 to β9 are approximately 0.0625.

5. An image display apparatus comprising:

an image processing apparatus including a resolution converting unit configured to perform resolution conversion on image data to generate pixel data having a resolution a times as high as a resolution of a display unit, where α>1;

an image processing unit configured to perform an image processing on the pixel data; and a decimation unit configured to decimate the pixel data on which the image processing has been performed, to have a resolution equal to or lower than the resolution of the display unit, and to output decimated data to the display unit; wherein the decimation unit is configured to output, to the display unit, pixel data of M×N pixels formed in a delta array, the pixel data having N lines of pixel lines each of which includes M pieces of pixels arranged in a horizontal direction at a pitch Ph, the pixel lines arranged in a vertical direction at a pitch Pv, the delta array in which two pixel lines adjacent to each other are shifted by approximately 0.5 Ph in the horizontal direction, the resolution converting unit is configured to generate the pixel data of 2M×N pixels by combining a first sub-output image of M×N pixels having N lines of pixel lines each of which includes M pieces of pixels arranged in a horizontal direction at a pitch Ph, the pixel lines arranged in a vertical direction at a pitch Pv, the first sub-output image in which two pixel lines adjacent to each other are shifted by approximately 0.5 Ph in the horizontal direction, and a second sub-output image of M×0.5N pixels having 0.5N lines of pixel lines each of which includes M pieces of pixels arranged in a horizontal direction at a pitch Ph, the pixel lines arranged in a vertical direction at a pitch Pv×2, the image processing unit is configured to perform the image processing on the pixel data of the 2M×N pixels, and the decimation unit is configured to decimate the pixel data of the 2M×N pixels to the pixel data of M×N pixels; and a display element capable of controlling a light according to output image data generated by the image processing apparatus, and configured to display an image obtained by combining the first sub-output image and the second sub-output image.

6. The image display apparatus according to claim 5, wherein the display element forms the first sub-output image with at least a green pixel.

7. The image display apparatus according to claim 5, wherein the display element is configured to display colors other than green at positions adjacent to a pixel of green so that the positions are alternately different from each other.

* * * * *